UNITED STATES PATENT OFFICE.

STEPHEN R. ANDRES, OF TROY, AND SAM. ANDRES AND MACDONOUGH BUCKLIN, OF NEW YORK, N. Y.

IMPROVEMENT IN ARTICLES OF FOOD MADE OF SWEET-POTATOES.

Specification forming part of Letters Patent No. 34,389, dated February 11, 1862.

*To all whom it may concern:*

Be it known that we, STEPHEN R. ANDRES, of Troy, in the county of Rensselaer, in the State of New York, and SAMUEL ANDRES and MACDONOUGH BUCKLIN, both of the city, county, and State of New York, have invented a new and useful Article of Food Manufactured from the Sweet-Potato; and we do hereby declare that the following is a full and exact description thereof and of the mode of manufacturing the same.

This invention relates to the manufacture of a desiccated article of food from the sweet-potato. It is well known that the sweet-potato is so perishable in its natural state as to be incapable of being transported to great distances, being extremely liable to heat and rot. It is consequently unknown to the European markets. This difficulty we have overcome. By our process the sweet-potato is preserved in all its excellence, and can be safely transported to any part of the world. It is exceedingly useful for puddings, pies, &c, at sea, and in places where the ordinary materials used for such things cannot be obtained.

To enable others to manufacture our desiccated sweet-potato, we will describe our mode of manufacturing the same.

We select sweet-potatoes of good quality and nearly equal size, and, having washed them clean, put them into a suitable vessel and steam them until they are cooked. We then remove the skins and strings that adhere to them and spread them out to cool. When cold we mash or otherwise crush them, and having spread them upon a wire-cloth sieve we place them in a kiln, in which they are exposed to a strong current of moderately-heated air until they are thoroughly dried. The air used for drying them ought not to be too hot, as the sweet-potato contains a large quantity of saccharine matter, which is much injured by too much heat. About 150° Fahrenheit is a good temperature.

What we claim as our invention, and desire to secure by Letters Patent, is—

Desiccated cooked sweet-potatoes, as a new article of manufacture, made as described, or in any equivalent way.

STEPHEN R. ANDRES.
   SAMUEL ANDRES.
   MACDONOUGH BUCKLIN.

Witnesses:
 W. B. H. ANDRES,
 A. R. CUSHMAN.